United States Patent [19]

Nelson et al.

[11] 3,762,090

[45] Oct. 2, 1973

[54] FISHING ROD SUPPORT AND HOOK SETTING APPARATUS

[76] Inventors: Maynard E. Nelson, 2036 Raymond; Robert G. De Witt, 1215 Gypsum, both of Salina, Kans.

[22] Filed: Jan. 26, 1972

[21] Appl. No.: 220,831

[52] U.S. Cl. .................................................. 43/15
[51] Int. Cl. ............................................. A01k 97/00
[58] Field of Search .......................................... 43/15

[56] References Cited
UNITED STATES PATENTS
3,562,947   2/1971   Martin .................................... 43/15
2,642,690   6/1953   Soenksen ................................ 43/15

Primary Examiner—Louis G. Mancene
Assistant Examiner—Daniel J. Leach
Attorney—Robert G. McMorrow

[57] ABSTRACT

A fishing rod support in which an upright standard has a pivotal spring biased sleeve holding the butt or handle of a fishing rod assembly, and the rod forward section is held in fishing position by a trip member. A line engaging finger is moved responsive to the exertion of a pull on the line and pivots the trip member to a position which releases the rod, causing the spring sleeve to pivot the rod sharply to hook setting position.

1 Claim, 4 Drawing Figures

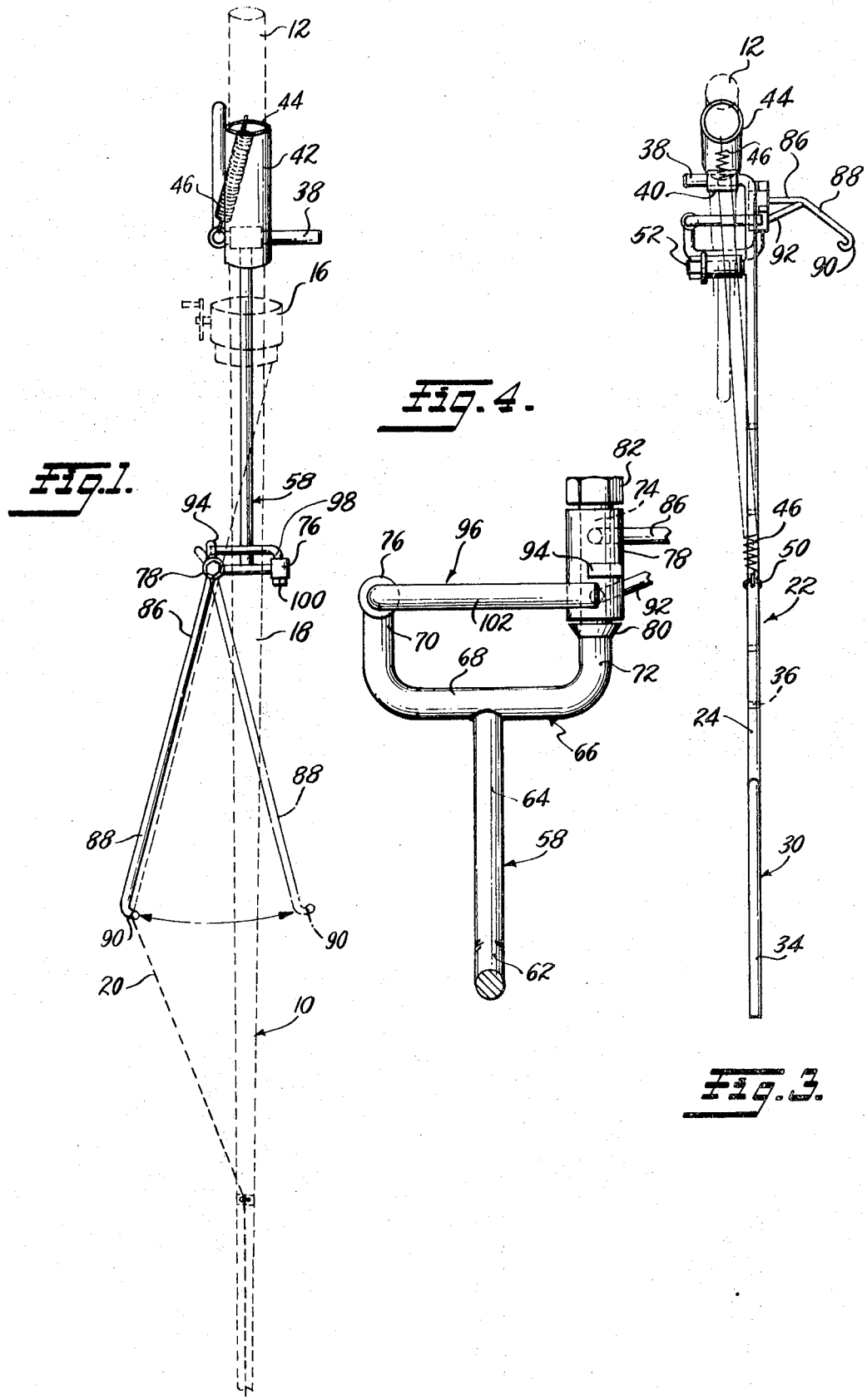

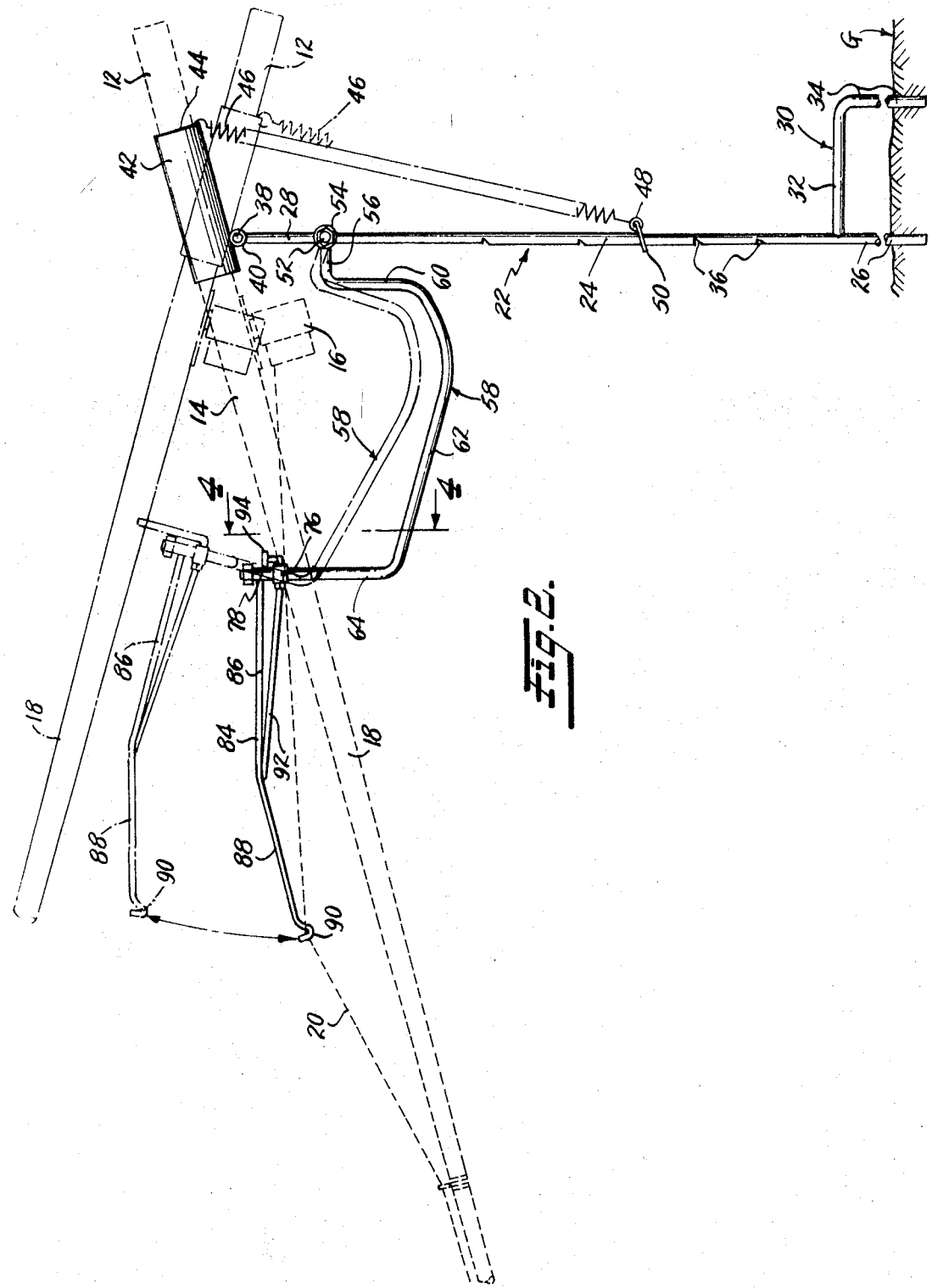

FISHING ROD SUPPORT AND HOOK SETTING APPARATUS

BACKGROUND OF THE INVENTION

1. Field of the Invention

This invention relates to that category of fishing rod supports which include a mechanism to pivot the rod in a hook setting maneuver in response to a pull or jerk on the fishing line.

2. Statement of the Prior Art

It has heretofore been proposed to provide fishing rod supports which either hold the rod in fishing position, or in some instances, provide a hook setting function. Illustrative of such prior proposals are those disclosed in the following United States patents:

| Patent No. | Patentee | Issue Date |
|---|---|---|
| 2,661,563 | Adams et al. | Dec. 8, 1953 |
| 2,713,741 | Gnagy | July 26, 1955 |
| 2,804,277 | Kinder | Aug. 27, 1957 |
| 2,821,041 | Hughes | Jan. 28, 1958 |
| 2,944,361 | Coulter | July 12, 1960 |
| 2,964,868 | Bennett | Dec. 20, 1960 |
| 3,055,136 | Scott et al. | Sept. 25, 1962 |
| 3,453,765 | Gibbons | July 8, 1969. |

SUMMARY OF THE INVENTION

The present invention is direced to the provision of a rod holder with a hook setting function which is sufficiently positive in operation to insure the hook setting capability of the apparatus, and is at the same time, of non-complex construction and operation. In achievement of this objective, the components are arranged such that the rod is normally maintained in a slant position with its tip down, and upon exertion of a pull or tug on the line is sharply pivoted to a tip up position.

The apparatus hereof is constructed principally of metal or other rigid materials, but is nonetheless light in weight and therefore readily portable. By virtue of its ready portability, it increases the enjoyment of fishing for elderly persons and the like. The apparatus is compact in design and requires only a minimum of storage space when not in use.

Other and further objects and advantages of this invention will be apparent to those skilled in the art from a consideration of the following specification when read in conjunction with the annexed drawings.

BRIEF DESCRIPTION OF THE DRAWINGS

FIG. is a plan view of the fishing rod support and hook setting apparatus of the present invention, the position of the rod after a fish has been hooked being shown in phantom lines;

FIG. 2 is a side elevational view of the device as viewed from the right side of FIG. 1;

FIG. 3 is an end elevational view of the device of FIG. 2; and

FIG. 4 is an enlarged vertical sectional view, taken on the line 4—4 of FIG. 2, looking in the direction of the arrows.

DESCRIPTION OF THE PREFERRED EMBODIMENT

Referring to the drawings in more detail, it will be observed therein that a typical fishing rod,, reel and line assembly is diagrammatically shown for purposes of orientation of the components of the invention thereto, and to illustrate the operation of the device. The assembly includes a rod 10 having a handle section 12, a reel seat 14 with a reel 16 thereon, a forward rod section 18, and a line 20.

Apparatus according to this invention and for use with rod assemblies as aforesaid is generally designated in the drawings by reference character 22. The assembly 22 includes an elongated upright standard 24 of metallic rod stock or the like having a lower end portion 26 and an opposite upper end portion 28. A stabilizing brace 30 for the support includes a perpendicular arm 32 fixed to the lower end portion, and a rod 34 parallel to the standard 24 and comprising a right angular extension of the arm. As best shown in FIG. 2, the lower extremities of the end portion 26 and parallel rod 34 are embedded in the ground G during use of the apparatus.

The standard 24 has a series of vertically spaced notches 36 formed in the leading or forward side thereof. The notches are of a configuration such that they include a top perpendicular to the main vertical axis of the support and a slanted lower entry wall, thereby facilitating engagement and disengagement of a spring biased bail, described below. The standard upper end portion 28 has a first right angular lateral extension 38 about which is a journal member 40. A normally horizontal, enlarged sleeve 42 is fixed to the journal member for pivotal movement therewith about the lateral extension. Secured to the trailing end 44 of the sleeve is one end of a coil spring 46. The other end of said spring is secured to an annular washer 48 which is connected to an annular bail member 50. The bail is selectively engagable in the notches 36 and the tension on the spring 46 is variable as a function of the selection of the notch.

Intermediate the ends of the standard 24 and adjacent the upper end 28 thereof is a second right angular lateral extension 52. A second tubular journal 54 is pivotally mounted on said extension and carries an end member 56 of a generally u-form bracket assembly 58 therewith. The bracket assembly is elongated and has a first leg 60 depending from the end member 56, and a curvilinear main span 62, and an outer upright 64. Fixed on the distal end of the outer upright is a yoke 66 comprising a bight portion 68, and a pair of upwardlyy projecting arms 70 and 72. As shown in FIG. 4, the arm 72 is elongated to provide an upright axle 74, while the arm 70 has a tubular piece 76 arranged at right angles thereto.

A tubular collar 78 is mounted on the axle 74, by a lower abutment 80 and by a lock nut 82, and the collar is pivotal between the latter elements on said axle. An elongated finger 84 includes a first section 86 secured to the collar for movement therewith, a second section 88 angularly related to the first section, and a line engaging hook 90 on the distal extremity of the latter. The finger 84 is rigidified by a supplemental arm member 92 which is fixed at one end to the collar 78 and at the other end to the first section 86. A stub shaft 94 extends from the collar at a radius thereof remote from the radius of extension of the finger.

Pivotally secured in the tubular piece 76 is an L-shaped rod trip 96 comprising a foot member 98 retained in the element 76 by an enlarged bolt head 100, and an elongated leg member 102 which is engagable under the stub shaft 94.

Operation of the device is believed apparent from the foregoing description of structure. The rod assembly is placed in position in the holder, with the handle section 12 seated in the sleeve 42. The forward rod section 18 is then seated in the yoke 66 against its bight 68, and the leg member 102 pivoted thereover. The stub shaft 94 retains the leg in place over the rod — the line 20 being engaged over the hook 90 of the finger 84 which serves to retain the same in this position under normal tension. The exertion of a jerk or pull on the line as when a fish strikes the bait, causes the finger to swing laterally, releasing the stub shaft from over the arm and causing the spring 46 to pivot the sleeve and propel the rod tip upwardly — see the sequence shown in FIG. 2.

We claim:

1. A fishing rod support and hook setting apparatus for use with a fishing rod assembly having a handle section, a reel seat with a reel thereon having a line, and having a forward rod section, the support and hook setting apparatus comprising:

an elongated upright standard having a lower end portion and an upper end portion;

the lower end portion being adapted for ground engagement;

a stabilizing brace on the lower end portion of said upright support, including a perpendicular arm fixed to said support and a parallel rod to be embedded in the ground at a location spaced from the support;

the standard having a series of vertically spaced notches formed in a leading side thereof, said notches each having a top perpendicular to the upright standard and a slanted entry section;

a substantially horizontal sleeve pivotally mounted on the upper end portion of the standard, the sleeve having a leading end and a trailing end;

spring means, comprising an elongated coil spring fixed to the trailing end of the sleeve and to a changeable bail;

the bail being engaged selectively in said notches of said standard to vary the degree of tension on said spring, the bail engaging against the top of the selected notch;

a transverse bracket assembly pivotally mounted on the standard intermediate the ends thereof;

the bracket including a yoke having a bight portion and upward arms, one of said arms having an upright axle thereon and the other of said arms having a perpendicular tubular bearing element;

a tubular collar captively mounted for rotation on said axle and having an elongated finger element with a line engaging hook at its distal extremity and further having a stub shaft disposed substantially opposite the finger element;

the elongated finger element including a first section and a second section, the distal extremity being on said second section, and the sections being angularly related to one another;

a supplemental arm member fixed to the finger and substantially coextensive in length therewith and fixed to said tubular collar; and an L-shaped rod trip having a foot member pivotally mounted in said tubular bearing element and having a leg member engagable with said stub shaft and engagable over the forward rod section when the line is engaged by said hook, the exertion of a pull on said line pivoting the finger element laterally to disengage the leg member from above the rod forward section whereby the sleeve carrying the rod handle is pivoted to force the rod upwardly.

* * * * *